United States Patent [19]
Sheel et al.

[11] Patent Number: 5,861,189
[45] Date of Patent: Jan. 19, 1999

[54] METHOD FOR PRODUCING MIRRORS BY SURFACE ACTIVATION AND PYROLYTIC DEPOSITION

[75] Inventors: David William Sheel, Aughton; Joseph Earle Lewis, Ormskirk, both of United Kingdom

[73] Assignee: Pilkington PLC, St. Helens, United Kingdom

[21] Appl. No.: 585,318

[22] Filed: Jan. 11, 1996

[30] Foreign Application Priority Data

Jan. 9, 1995 [GB] United Kingdom ............... 9500330

[51] Int. Cl.⁶ ............................................. C23C 16/06
[52] U.S. Cl. .................... 427/166; 427/250; 427/252; 427/255; 427/255.1; 427/304; 65/60.2; 65/60.4; 65/60.7
[58] Field of Search ........................... 427/166, 250, 427/255, 255.1, 252, 304; 65/60.2, 60.4, 60.7

[56] References Cited

U.S. PATENT DOCUMENTS

| 3,656,926 | 4/1972 | Loukes et al. ........................... 65/60 |
| 3,681,042 | 8/1972 | Edwards et al. ......................... 65/60 |
| 4,661,381 | 4/1987 | Callies et al. ......................... 427/255 |
| 4,923,717 | 5/1990 | Gladfelter et al. ..................... 427/252 |

FOREIGN PATENT DOCUMENTS

| 253417 | 5/1963 | Australia . |
| 0226993 | 7/1987 | European Pat. Off. . |
| 0275474 | 7/1988 | European Pat. Off. . |
| 0275662 | 7/1988 | European Pat. Off. . |
| 0348185 | 12/1989 | European Pat. Off. . |
| 0482933 | 4/1992 | European Pat. Off. . |
| 0583871 | 2/1994 | European Pat. Off. . |
| 2436480 | 4/1980 | France . |
| 60-215762 | 10/1985 | Japan . |
| 1507996 | 4/1976 | United Kingdom . |
| 1507465 | 4/1978 | United Kingdom . |
| 1573154 | 8/1980 | United Kingdom . |
| 2248853 | 4/1992 | United Kingdom . |

OTHER PUBLICATIONS

Beach, B et al, "Chemical Vapor Deposition of Aluminum from Trimethylamine–alane", J.Vac.Sci.Technol.A 7(5), Sep./Oct. 1989, pp. 3117–3118.

Chemical Abstracts, vol. 119, No. 4, 26 Jul. 1993, Columbus, Ohio, Abstract No. 33107u, p. 336; and JP A 00 585 773, Central Glass Co. Ltd., 26 Sep. 1991.

Patent Abstracts of Japan, vol. 10, No. 78 (C–335) [2135], 27 Mar. 1986 and JP A 60 215762, Asahi Glass KK, 29 Oct. 1985.

Chemical Abstracts, Vo. 115, No. 26, 30 Dec. 1991, Columbus, Ohio, Abstract No. 285686f, p. 364, and JP A 03 126 644, Asahi Optical Co. Ltd., 29 May 1991.

*Primary Examiner*—Shrive Beck
*Assistant Examiner*—Timothy Meeks
*Attorney, Agent, or Firm*—Howrey & Simon

[57] ABSTRACT

A method of producing mirrors comprising depositing a reflecting metal layer by pyrolysis on a ribbon of hot glass during the glass production process characterized by applying to the glass ribbon prior to deposition of the reflecting metal layer a primer for enhancing metal nucleation on the glass. The invention also provides a method of producing mirrors during the glass production process the method comprising pre-treating the surface of a ribbon of hot glass with an activating agent and pyrolytically depositing over the pre-treated surface a reflecting metal layer.

15 Claims, 2 Drawing Sheets

METHOD FOR PRODUCING MIRRORS BY SURFACE ACTIVATION AND PYROLYTIC DEPOSITION

BACKGROUND TO THE INVENTION

The invention relates to a method of producing mirrors, and to coated glass substrates incorporating highly reflecting "mirror" coatings.

The light reflecting properties of mirrors are generally provided by a layer of highly reflecting metal, especially silver, aluminium or chromium, applied to a glass or plastics substrate; copper layers are sometimes used as an alternative, but are generally less acceptable because of the strong red tint of the reflected light.

Silver coatings are generally applied to preformed glass plates, in the cold, by wet chemical methods in which a solution of silver salt is applied to the glass surface and reacted with a reducing agent which reduces silver ions present to silver metal which deposits on the glass surface. The silver used is not very durable in use and in practice requires protection by other layers, and these methods are generally unsuitable for application to glass on the production line on which it is formed so that a separate "silvering" line is required to produce the silvered glass.

Aluminium coatings are difficult to apply by chemical methods because of the strongly reducing nature of aluminium metal, and aluminium mirrors are generally produced by deposition methods carried out at low pressure e.g. by sputtering. Such low pressure methods are essentially batch processes and, like the wet chemical methods used for deposition of silver mirrors, are generally unsuitable for on-line application on the production line on which the glass is made.

U.S. Pat. No. 3,656,926 and U.S. Pat. No. 3,681,042 each propose a process for the production of mirror coatings by condensing a metal vapour on the hot glass surface on the production line on which the glass is made. According to U.S. Pat. No. 3,656,926, a body of molten metal, for example silver, aluminium copper or gold, is located adjacent the upper surface of the glass by a beam of refractory material extending transversely across the glass width, and an electrical current is passed through the beam of refractory material extending transversely across the glass width, and an electrical current is passed through the beam to heat the beam, for example to a temperature of 2000° C., and evaporate the metal for condensation on the adjacent glass. According to U.S. Pat. No. 3,681,042 a body of molten metal, for example silver, aluminium, gold, copper or tin, is contained in a trough in a duct supported over the glass ribbon and heated to a high temperature, for example 2000° C., and a carrier gas passed over the molten metal body in the trough to entrain metal vapour evaporating therefrom. The carrier gas containing the metal vapour is directed towards the glass surface where the metal vapour condenses on the glass. To improve the adhesion of the reflecting metal to the glass, it is further proposed to first deposit, in a similar manner, a keying layer of tungsten palladium, nickel or a palladium nickel alloy on the glass before deposition of the reflecting layer. Both these techniques require use of extremely high temperatures and neither has found commercial application.

Silicon has been deposited on hot glass during the glass production process to produce reflecting layers (which, like silver and aluminium layers, are substantially neutral in reflection colour) for use on architectural glazing for aesthetic and solar control purposes. GB-A-1507465, GB-A-1507996 and GB-A-1573154 relate to a continuous chemical vapour deposition method for producing float glass having such a silicon layer, and U.S. Pat. No. 4,661,381 describes a development of that method. However, such silicon layers do not provide the high reflections commonly required in mirrors, Thus REFLECTAFLOAT (trade mark) glass, commercially available from Pilkington Glass Limited of St Helens, England, has a reflection of about 50%, and MIRROPANE EP (trade mark) commercially available from Libbey-Owens-Ford Co, has a reflection of about 60%.

EP-A-0583871 discloses mirrors and their production in which a mirror coating comprises a stack of layers. The mirrors may be produced on-line during manufacture of the glass, for example during the float glass production process. The layers comprise materials which can be deposited on-line, for example non-metallic materials such as silicon, silicon dioxide, titanium dioxide, etc. It is disclosed that reflective metals, for example aluminium, chromium, cobalt or titanium may be used as an alternative to silicon and that a metal may be deposited by condensation of a metal vapor or by chemical vapor deposition using a suitable organometallic vapour. However, no specific conditions for metal deposition onto the glass substrate are disclosed.

GB-A-2248853 disclose a pyrolytic metal of coating glass with aluminium to form a mirror. A solution of an alane amine adduct is formed and the liquid is deposited onto heated glass. The adduct decomposes to form an aluminium coating. It is envisaged that the invention may be used in conjunction with float glass production, and suggested that the aluminium deposition may be carried out on hot glass, typically at 180° C., emerging from the float glass process. Unfortunately, it has been found that coatings produced in the manner described are insufficiently durable for commercial application as mirrors.

SUMMARY OF THE INVENTION

There is a need in the art for a method for reliably depositing a reflective metal onto a glass substrate during the glass production process to yield a reflecting coating having good optical and mechanical properties to enable the coated glass substrate to be used as a mirror.

According to the present invention there is provided a method of producing mirrors comprising depositing a reflecting metal layer by pyrolysis on a ribbon of hot glass during the glass production process and applying to the glass ribbon prior to deposition of the reflecting metal layer a primer for enhancing metal nucleation on the glass.

Preferably, a primer layer is deposited by pyrolysis on the hot glass ribbon.

The expression "mirror" is used in the present specification and claims to refer to a coated glass substrate having a visible light reflection (when viewed from the coated side or the glass side, whichever gives the higher reflection) of at least 70%. The expression "visible light reflection" refers to the percentage of light reflected under Illuminant D65 source, 1931 Observer Conditions. The term "pyrolysis" is used to refer to a process of decomposition of precursor material with or without involvement of an additional reactant, for example oxygen or water, under the effect of heat.

The present invention also provides a method of producing mirrors during the glass production process, the method comprising pre-treating the surface of a ribbon of hot glass with an activating agent and pyrolytically depositing over the pre-treated surface a reflecting metal layer.

The primer layer or surface pre-treatment serves to enhance nucleation of the metal forming the reflecting metal layer and hence improve its structural refinement leading to better adhesion and a denser layer with consequently enhanced durability. The improved structure may also lead to a beneficial increase in the light reflection of the metal layer.

The surface pre-treatment may be carried out on the glass surface directly or on a barrier layer which has previously been applied to the glass surface, for example by a pyrolytic deposition process. The barrier layer acts to reduce or prevent ions in the glass most particularly alkali metal ions, e.g. sodium, from interfering with the nucleation and growth of the reflecting metal layer. This has been found by the inventors to reduce the haze of subsequently deposited aluminium coatings. The barrier may comprise $SiC_xO_y$, i.e. a silicon oxide with a significant proportion, typically around 25 to 30 at%, of carbon therein; silicon oxide or aluminium oxide.

Surprisingly, improved results may be obtained by using a surface pre-treatment which simply "passivates" the glass surface, presumably because the glass surface contains sites that are energetically unfavourable for metal nucleation. A primer layer of silicon oxide or silicon nitride may be used and is believed to function in this way. However, it is preferred to use a metal oxide layer which actually provides favourable nucleation sites; the metal oxide layer should itself show good adhesion to glass, be readily deposited and, if the mirror is to be used as a back surface mirror, preferably be substantially transparent to visible light. Preferred metal oxide layers for use as primer layers are tin oxide and titanium oxide.

It is generally unnecessary for the primer layer to be more than a few monolayers thick, although thicker layers may be used if desired. In order to provide nucleation sites on the glass, the primer layer may be discontinuous. The primer layer may be deposited by pyrolysis on the hot glass ribbon. For example, a silicon oxide layer may be deposited in known manner (see, for example, European patent specifications EP-A-0275662 and EP-A-0348185) by applying a gaseous mixture of a silane, an unsaturated hydrocarbon and carbon dioxide or other oxygen-containing gas to the hot glass surface at a temperature in the range 600° C. to 750° C.; the term silicon oxide is used herein to encompass oxides of silicon containing other elements, for example carbon or nitrogen, which are typically found in silicon oxide layers prepared in the manner indicated. A metal oxide layer may be deposited by pyrolysis (i.e. decomposition, with or without involvement of an additional reactant, for example oxygen or water, under effect of heat) of a metal halide, for example tin tetrachloride or titanium tetrachloride; if only a very thin metal oxide primer, layer is required sufficient oxygen will generally be available from the glass surface to form the metal oxide primer layer, but if required an additional source of oxygen, for example water, may be used.

In accordance with a particularly preferred aspect of the present invention, the surface pre-treatment of the glass or a barrier layer overlying the glass comprises surface activation of the surface to be coated by the reflecting metal layer by the use of a metal halide, most preferably titanium tetrachloride, which is introduced into the atmosphere above the surface to be coated. The inventors have found that the use of such a surface activation with titanium tetrachloride greatly increases the degree of reflectivity of the metal coating and also the uniformity of the metal coating obtained. The precise mechanism by which the surface is activated by the titanium tetrachloride prior to deposition of the metal is not fully comprehended. Without being bound by theory, the titanium tetrachloride is believed to react with the underlying surface to form a titanium compound, which may include a Ti—O bond and which acts as a low energy site for nucleation of the metal layer. The present inventors have carried out Auger profiling of reflecting coatings of aluminium deposited using a titanium tetrachloride pre-treatment during on-line manufacture of the glass. The inventors found titanium present in only a very small amount of from 0.5 to 1 at% underneath the reflecting aluminium layer. This suggests that the titanium tetrachloride may be acting primarily as a catalyst activating the nucleation of the aluminium metal on the glass or barrier layer surface. The inventors have found during on-line tests that it is possible, using low temperature pyrolysis of certain metal precursors such as alanes, that if there is no pretreatment of the glass or barrier layer surface, then no reflective aluminium layer is deposited and that in addition if the pre-treatment is carried out for too long so as to deposit a thick coherent layer of titanium dioxide over the substrate, either no or only very thin and semi-transparent aluminium coatings are formed. If a titanium dioxide layer is formed during the pre-treatment, it is believed that this layer preferably should be discontinuous and up to around 400 Angstroms thick.

The use of a primer layer in accordance with the present invention is most beneficial when the reflecting metal layer is applied to the glass ribbon at a location where the glass temperature is below 400° C., and becomes more beneficial as that application temperature is reduced. Thus, in preferred aspects of the invention, the reflecting metal layer is applied to the glass ribbon at locations where the glass temperature is below 300° C. or even below 200° C.

It is preferred, for reasons of operational convenience and control, to deposit the reflecting metal layer by pyrolysis of a metal precursor supplied in the vapour phase, and the ability to achieve a durable product at a low deposition temperature facilitates the use of metal precursors which are volatile at low temperature and/or tend to decompose in the gas phase at higher temperatures.

The reflecting metal is conveniently aluminium, which has both a high light reflection and a neutral colour in reflection, although other metals with sufficiently high light reflection, for example copper, silver, gold, palladium, rhodium, or platinum may be used provided suitable precursor materials are available. A combination of metals, for example, a metal alloy may be used if desired. It is not essential for the metal layer to be of pure metal, and small amounts of other elements, for example up to about 20 at%, preferably up to about 10 at%, e.g. one or two atomic percent of oxygen or carbon, may be present provided the required high reflection is achieved.

Suitable precursor materials include metal hydrides and organometallic compounds, for example metal alkyls and metal acetylacetonates, which may be used in solution or in the vapour phase. Preferred materials include an Al—H bond. The vapour may be produced by vaporisation in conventional manner, or by "nebulising", that is, forming a solution of the metal precursor (or liquid metal precursor) into very fine droplets (commonly described as an aerosol) in a heated carrier gas so that the metal precursor vaporises in the carrier gas. Typically, the vapour is formed by bubbling nitrogen gas through the precursor in liquid form. When depositing aluminium as the reflecting metal, we prefer to use alanes, especially the alane products of GB-A-2248853, the disclosure of which is hereby incorporated herein by reference. It is particular preferred to use alane adducts of the formula $AlH_3.[NR^1R^{11}R^{111}]_n$ wherein n is in the range 1 to 10, and $R^1$, $R^{11}$ and $R^{111}$ are each alkyl radicals containing 1 to 4, especially 1 or 2, carbon atoms, for example $AlH_3.[N(CH_3)_2C_2H_5]_n$ wherein n is in the range 1 to 10.

Whatever precursor material is employed, it is important to ensure that the precursor material is delivered to the glass at the correct temperature so as to ensure that deposition of aluminium is achieved by decomposition or reaction of the precursor and it is also important that the glass substrate is at the appropriate temperature for successful deposition. For example, for successful deposition of aluminium from alane dimethylethylamine the glass substrate is typically around 170° C. In addition, the alane dimethylethyleamine precursor should preferably be delivered from the bubbler and delivery lines held at approximately 50° C. and once at this temperature preferably the precursor should be utilised for coating as soon as possible in order to avoid degradation of the coating. If the precursor is delivered at lower temperatures, then decomposition of the precursor may not be reliably achieved. If the precursor is delivered at higher temperatures, then it is possible that the precursor decomposes on surfaces other than the glass substrate, for example parts of the coating apparatus which can reduce or even prevent successful deposition of the aluminium on the glass substrate. The temperature of the coating apparatus may be increased as compared to the temperature of the bubbler in order to obtain reliable deposition of the aluminium from the alane adduct. Typically, the coating apparatus may be held at a temperature of around 100° C. over the glass substrate.

BRIEF DESCRIPTION OF THE DRAWINGS

Embodiments of the present invention will now be described by way of example only with reference to the accompanying drawings, in which.

DETAILED DESCRIPTION OF THE PREFERRED EMBODIMENTS

Figure 1:
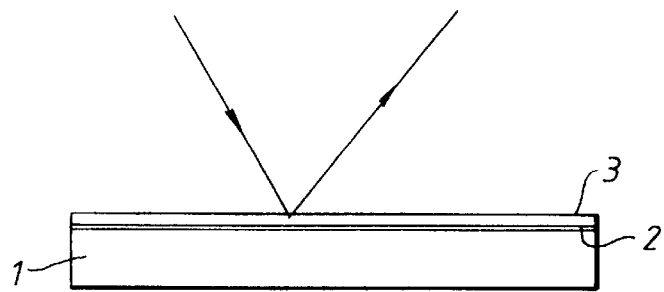
FIG. 1 is a section (not to scale) through a mirror produced in accordance with one embodiment of the present invention.

Referring to FIG. 1, a mirror, shown acting as a front surface mirror, comprises a glass substrate 1, carrying a primer layer 2 and a reflective metal layer 3. The primer layer is preferably a very thin layer of tin oxide or titanium oxide, while the reflecting metal layer is preferably a layer of aluminium.

Figure 2:
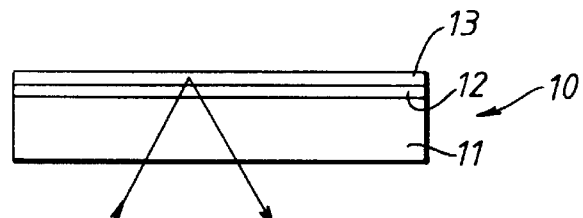
FIG. 2 is a section (not to scale) through a mirror produced in accordance with a second embodiment of the invention.
Figure 3:
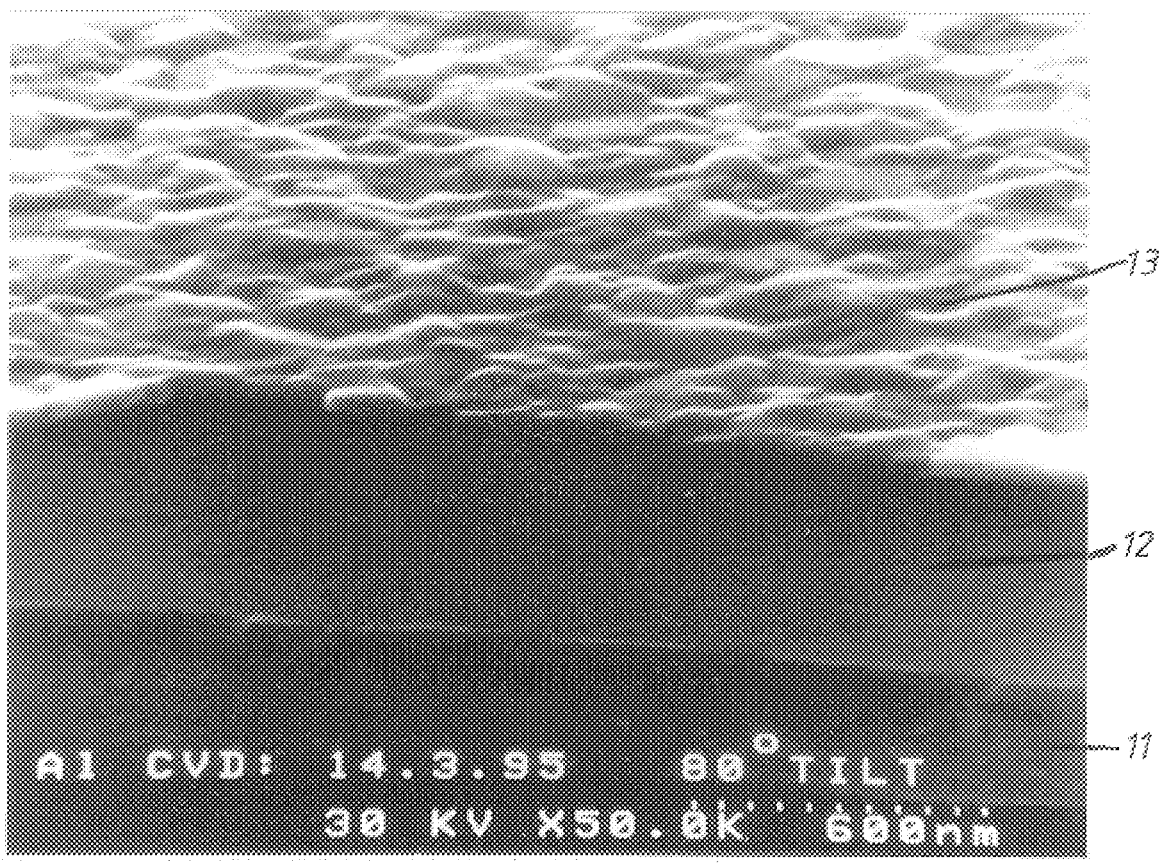
FIG. 3 is a scanning election micrograph of an edge of a mirror having the structure shown in FIG. 2.

Referring to FIG. 2, a mirror, designated generally as 10 and acting as a rear surface mirror, comprises a glass substrate 11 carrying a barrier layer 12 and a reflective metal layer 13. The barrier layer comprises a silicon oxycarbide, i.e. $SiC_xO_y$, containing around 25–30 at% carbon. The barrier layer has a thickness of typically from 300 to 700 Angstroms. The reflective metal layer 13 comprises a layer of aluminium at least around 200 Angstroms thick, typically around 500–700 Angstroms thick. The barrier layer may alternatively comprise silica or alumina. In this embodiment, the surface of the barrier layer 12 remote from the glass substrate 11 has been subjected, prior to the deposition of the reflective aluminium layer 13, to a surface pre-treatment comprising activation in an atmosphere of titanium tetrachloride. FIG. 3 is a scanning electron micrograph of a mechanically broken edge of the mirror illustrated in FIG. 2 which shows the glass substrate 11, the $SiC_xO_y$ barrier layer 12, which is 400 A thick, and the overlying aluminium layer 13, which is 600 A thick. The micrograph shows that no separately formed primer layer of any significant thickness can be seen. In the scale at the bottom of the micrograph, each graduation represents 600 Angstroms.

In the practical application of the invention, the primer layer and reflecting metal layer will be applied to the hot ribbon of glass, generally but not necessarily a ribbon of float glass, from coating stations located at appropriate positions (to provide the required glass temperatures) on the glass production line.

Figure 4:
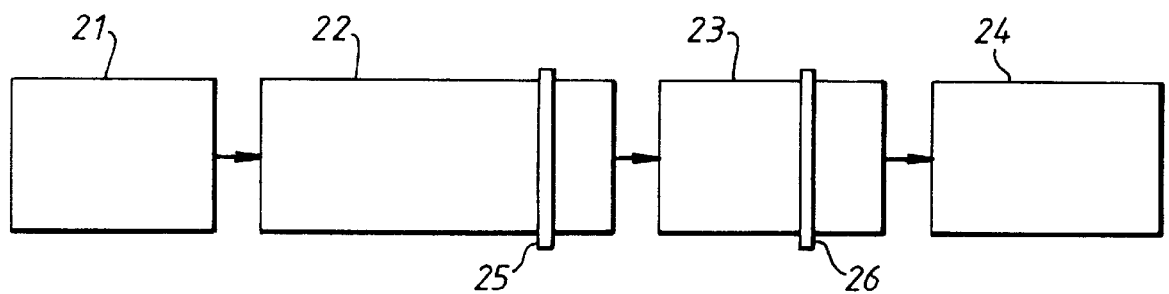
FIG. 4 is a diagrammatic representation of an arrangement of coating stations on a float glass production line for production of mirrors in accordance with the method of the present invention.

FIG. 4 illustrates, diagrammatically, a float glass production line comprising a glass melting section 21, a float batch section 22 for forming the molten glass into a continuous ribbon, a lehr section 23 for annealing the said glass ribbon and a warehouse section 24 for cutting glass from the ribbon for storage and/or distribution and use. A first coating station for applying the primer layer or performing the surface pre-treatment in accordance with the invention will normally be located in or between the float batch section 22 and lehr section 23, at a position where the glass ribbon has substantially reached its final thickness (usually at a glass temperature of around 750° C.) so that it is not subject to further stretching which might crack any coating applied, but where its temperature remains sufficiently high for formation of a further pyrolytic layer or for the pre-treatment. That temperature is dependent upon the nature of the pre-treatment and the barrier layer being formed. The first coating station may additionally or alternatively be employed to deposit a barrier layer on the glass surface. In the embodiment illustrated this first coating station 25 is shown located toward the downstream (cooler) end of the float bath section 22.

The coating station for applying the reflecting metal layer is located downstream of the first coating station and will usually, but not necessarily, be in the lehr section 23 where the glass temperature has fallen below 400° C. and preferably below 300° C. or even below 200° C.; in the drawing, this coating station 26 is shown located toward the downstream (cooler) end of the lehr section 23. An important advantage of applying the reflecting metal layer at low temperatures is that any annealing problems which might result from the presence of a reflecting metal layer on the glass, are thereby alleviated.

In the particularly preferred embodiment of the invention, the reflecting metal layer is deposited at a temperature of around 200° C. or less using as the aluminium precursor an alane adduct which is suitable for use in a low temperature delivery system. A particularly preferred alane adduct has a formula $AlH_3.[N(CH_3)_2C_2H_5]_{4.6}$ in dimethylethylamine in an oxygen-free nitrogen carrier gas. In such a low temperature delivery system, the use of a surface activation using titanium tetrachloride is particularly preferred. The titanium tetrachloride is delivered in vapour form in oxygen-free nitrogen gas which is passed over the heated glass surface. A most preferred temperature range for the glass is from around 170° to around 250° C., more preferrably from around 170° to around 180° C.

The hot ribbon of glass, bearing the primer and/or barrier layer and the reflecting metal layer, is cut into sections in generally known manner to provide large mirror sheets for cutting to the required size. The reflecting metal layers will generally have a sufficiently low light transmission for use as either front or back surface mirrors without the need for an opacifying layer. However, it may be desirable to apply a protective layer over the reflecting metal layer to enhance the durability of the mirror still further although, if the mirror is to be used as front surface mirror, such protective layer will obviously be chosen to have a high light transmission.

Reflective metal films formed in accordance with the invention were found by the inventors to have improved durability as compared to conventional silver metal mirrors and mirrors having reflecting layers of evaporated aluminium. The tests performed by the inventors yielded qualitative results.

Reflective aluminium films formed in accordance with the invention were tested for adhesion by wiping and by adhering and removing pressure-sensitive adhesive tape. It was found that the reflective metal films formed in accordance with the invention exhibited enhanced durability as compared to conventional silver metal layers and evaporated aluminium layers with the reflective aluminium layer remaining firmly adhered to the underlying glass substrate.

The "handleability" of the reflective metal layers formed in accordance with the invention was acceptable because the films survived general physical and mechanical handling during the manufacturing and testing procedures.

The chemical durability of the reflective metal films was tested by application of solvents and weak alkali solutions. The chemical durability was found to be improved as compared to the known silver metal and evaporated aluminium mirrors. It is believed by the inventors that this enhanced chemical durability may possibly result from the metal films containing carbon and oxygen contaminations therein.

The thermal durability of the reflective metal films was also tested by heat soaking the coated substrates at elevated temperatures. The reflective metal films were seen to be more stable to a heat soak test than evaporated aluminium.

The invention is still further illustrated by the following non-limiting Examples.

EXAMPLE 1

In an experiment designed to simulate production of a mirror by on-line application of a reflecting metal layer to a hot glass surface, a substrate of 4 mm clear float glass was placed on an electrically heated support in a tubular reactor. Th glass was heated to 125° C. and the reactor was alternatively evacuated and filled with dry nitrogen until the dew point in the reactor filled with nitrogen was below −30° C. Titanium tetrachloride vapour in dry nitrogen was then passed over the heated glass surface for about 30 seconds to deposit a thin titanium and oxygen containing primer layer on the glass. Thereafter the reactor was evacuated, filled with hydrogen and a solution of an alane adduct of formula $AlH_3 \cdot [N(CH_3)_2C_2H_5]_{4.6}$ in dimethyl ethyl amine as solvent was nebulised by directing a fine spray of the solution into the hydrogen atmosphere in the reactor to deposit a reflecting aluminium layer on the hot glass surface.

The resultant aluminium layer, which was about 500 Å thick, was durable and the mirror formed had a visible light reflection (viewed from the glass side) of up to 85%.

Comparative Example 1

An aluminium layer applied in a similar manner to a second glass substrate, but without the primer layer, was found to have poor adhesion to the glass surface and a maximum visible light reflection of 60%, indicating a less refined structure.

EXAMPLE 2

In this Example, a reflecting metal layer was deposited onto a glass substrate in a dynamic laminar coater which is capable of depositing multilayer coatings onto moving glass substrates in a controllable atmosphere. The dynamic laminar coater simulates the deposition of coatings onto glass during on-line production of the glass, for example in the float glass process. For example, an aluminium coating was deposited using a precursor of alane dimethylethylamine. A pre-treatment of the substrate employing titanium tetrachloride was employed in order to produce a smooth reflective aluminium coating.

A substrate of 4 mm thick SiCO coated float glass was placed in a substrate holder which in turn was positioned inside a preheated controlled atmosphere furnace. The glass was heated up to a temperature of around 170° C. within a nitrogen atmosphere. The glass was transported below a coating head, held at 25° C., at a speed of 388 mm/min, during which titanium tetrachloride vapour in oxygen-free nitrogen gas was passed over the heated glass surface. In this way, the barrier layer of SiCO was "primed" or activated by the titanium tetrachloride. The deposition time for the titanium tetrachloride was around 15.5 seconds, The glass, still at a temperature of around 170° C., was then transported below a second coating head, held at 50° C., at a speed of 240 mm/min, during which the vapour of a solution of an alane adduct of formula $AlH_3 \cdot [N(CH_3)_2C_2H_5]_{4.6}$ in dimethyethylamine in an oxygen-free nitrogen carrier gas was passed over the substrate surface. Such a vapour was achieved by bubbling nitrogen through the liquid solution of the alane adduct. A reflecting aluminium layer was deposited over the glass surface.

The resultant adherent aluminium layer was approximately 600 Angstroms thick. The mirror had a visible light reflection (viewed from the glass side) of up to 88%, and zero transmission. The glass had a brightness of 95% and the colour-coordinates were approximately neutral. In this specification, the coloured standard used was CIELAB (L*a*b*) with D65 Standard Illuminant Conditions and 1931 Observer Conditions as implemented by ASTM E 308-90. The parameter L* denotes the brightness and the parameters a* and b* denote the colour coordinates. As known by the person skilled in the art, when a* b*=±3, the colour is regarded as being approximately neutral.

Comparative Example 2

In contrast, when Example 2 was repeated by attempted application of an aluminium layer to a second substrate using similar conditions, but without the use of the surface pre-treatment with titanium tetrachloride, no aluminium was deposited onto the substrate.

In further tests when further glass substrates were subjected to similar deposition conditions, but with a longer pre-treatment with titanium tetrachloride having being carried out, which the inventors believe deposited a relatively thick layer of titanium oxide on the SiCO barrier layer, either no aluminum was deposited or a semitransparent (i.e. low-reflective) aluminium coating was deposited.

EXAMPLE 3

Example 3 essentially repeated Example 2 in passing a 4 mm SiCO coated float glass substrate through the dynamic laminar coater. The glass temperature was however approximately 180° C. The glass was subjected to a pre-treatment with titanium tetrachloride at a carrier speed of 388 mm/min and during the deposition of the aluminium from the same alane adduct the carrier speed was 240 mm/min. The coating formed was a reflective aluminium coating over all the substrate. When measured on the glass side, the minimum transmission was 0.3%, the maximum transmission was 3.0%, the reflectance was 67.69%, the brightness L* was 85.85, and the colour coordinates a* and b* were −2.17 and 1.15 respectively. These parameters may be compared to a standard silvered mirror having 89.42 as percentage reflectance, brightness L* 95.76, and colour coordinates a* and b* −2.18 and 1.95 respectively. When measured from the coated side, the coated aluminium mirror has the following properties: reflectance 86.9%, brightness L* 94.7 and colour coordinates a* and b* 0.17 and 0.17 respectively.

EXAMPLE 4

Example 4 was similar to Example 3 except that the substrate consisted of a float glass substrate having no barrier layer deposited thereon. The glass temperature was 180° C. and the coating conditions were the same as in Example 3. A reflective aluminium coating was deposited over all the substrate. On the glass side, the minimum and maximum percentage transmittance was 0.2% and 13.6% respectively. The reflectance was 69.88%, the brightness L* was 86.94% and the colour coordinates a* and b* were −2.18 and 0.83 respectively. On the coated side, the reflectance was 74.52%, the brightness L* was 89.17% and the colour coordinates a* and b* were −2.92 and 0.68 respectively.

EXAMPLE 5

In this Example, aluminium was deposited on-line onto a ribbon of float glass. The float glass had a thickness of 1.1 mm and was travelling at a line speed of 365 m/hour. The pre-treatment with titanium tetrachloride and the deposition of the aluminium reflective layer were initially attempted at a position where the glass temperature was 130° C. It was found that at a glass temperature of 130° C., the glass temperature was too low to achieve deposition of aluminium on the glass substrate. When the glass temperature was increased to 170° C., reflective aluminium coatings were observed. The inventors found that the temperature of delivery of the aluminium precursor, i.e. the alane dimethyethylamine adduct, affected the coating achieved. The precursor was delivered in nitrogen carrier gas from a bubbler held at a temperature of around 60° C. At a coating head temperature of around 60° C. only patchy coatings of aluminium were obtained and it is believed that this was because not enough heat was provided to the alane adduct to achieve decomposition of the precursor. When the temperature of the coating head was increased to 100° C., at this higher temperature a higher decomposition efficiency was achieved enabling more uniform coatings of aluminium to be obtained. When the coating head temperature was further increased to 180° C., the thickness of the coating was reduced and it is believed by the inventors that the reason for this is that, the precursor was controlled to provide sufficient precursor to grow the required thickness of the metal coating at the coating station.

During the Example, the concentration of titanium tetrachloride was varied and it was found that an increased flow rate yielded a more uniform coating.

One sample of the coated glass product obtained in the Example was measured using atomic force microscopy and Auger XPS depth profiling against a reference standard. The aluminium coating had a thickness of around 225 to 250 Angstroms and had an average reflectivity of around 38.5%. The thickness of the reflecting aluminium layer was lower than produced using the dynamic laminar coater, but by varying the deposition time the thickness of the reflective aluminium coating would be increased, correspondingly increasing the reflectivity to a value acceptable for a mirror, e.g. at least 70% in visible light.

EXAMPLE 6

In this Example, which is similar to Example 1 in that the glass substrate was held stationary during the deposition process, the aluminium precursor comprised dimethyl aluminium hydride. A glass substrate was held stationary on a heated carbon susceptor at 230° C. The glass substrate was initially pre-treated with titanium tetrachloride in a manner similar to that described in Example 1. Subsequently, dimethyl aluminum hydride was delivered over the glass substrate. An opaque aluminium layer was deposited which exhibited metallic-like reflective properties.

What is claimed is:

1. A method of producing mirrors during a float glass production process the method comprising pre-treating a surface of a ribbon of hot float glass with a metal halide activating agent and pyrolytically depositing over the pre-treated surface a reflecting metal layer.

2. A method according to claim 1 wherein the metal halide comprises titanium tetrachloride in a non-oxidising carrier gas.

3. A method according to claim 1 wherein in the pre-treatment step the glass has a temperature of at least around 170° C.

4. A method according to claim 1 wherein the pre-treatment step is performed for a period of up to 20 seconds.

5. A method according to claim 1 wherein the reflecting metal layer comprises aluminium.

6. A method according to claim 5 wherein the aluminium is deposited from a precursor selected from the group consisting of an alane adduct thereof and an alkyl aluminium hydride.

7. A method according to claim 6 wherein when the aluminium is deposited the glass has a temperature of at least around 170° C.

8. A method according to claim 6 wherein the precursor is delivered to the glass surface in a nitrogen gas carrier.

9. A method according to claim 6 wherein the precursor is an alane adduct of aluminium and is delivered to the glass surface by a coating head which is at a temperature of around 100° C.

10. A method according to claim 6 wherein the precursor is an alkyl aluminium hydride and is delivered to the glass surface by a coating head which is at a temperature of around 230° C.

11. A method according to claim 1 further comprising, prior to the pre-treatment step, the step of forming a barrier layer over the glass surface.

12. A method according to claim 11 wherein the barrier layer is selected from the group consisting of silicon oxide with a proportion of carbon therein, $SiO_2$, and $Al_2O_3$.

13. A method according to claim 11 wherein the barrier layer is from 300 to 700 Angstroms thick.

14. A method according to claim 1 wherein the reflecting metal layer is from 500 to 700 Angstroms thick.

15. A method according to claim 1 wherein the activating agent is titanium tetrachloride.

* * * * *